April 9, 1935.  W. C. EDWARDS  1,997,457
MEANS TO ILLUMINATE A CONTROLLER
Filed Feb. 13, 1933
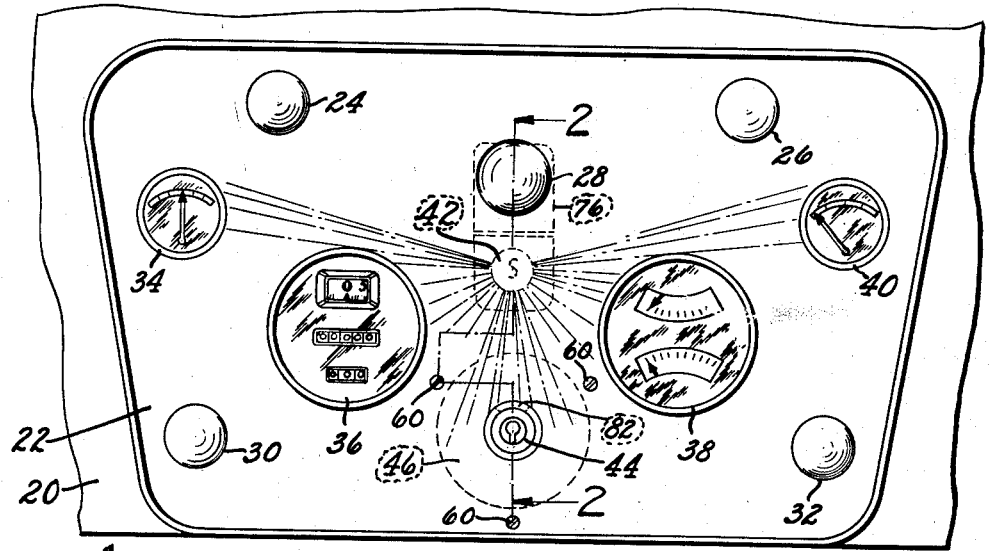
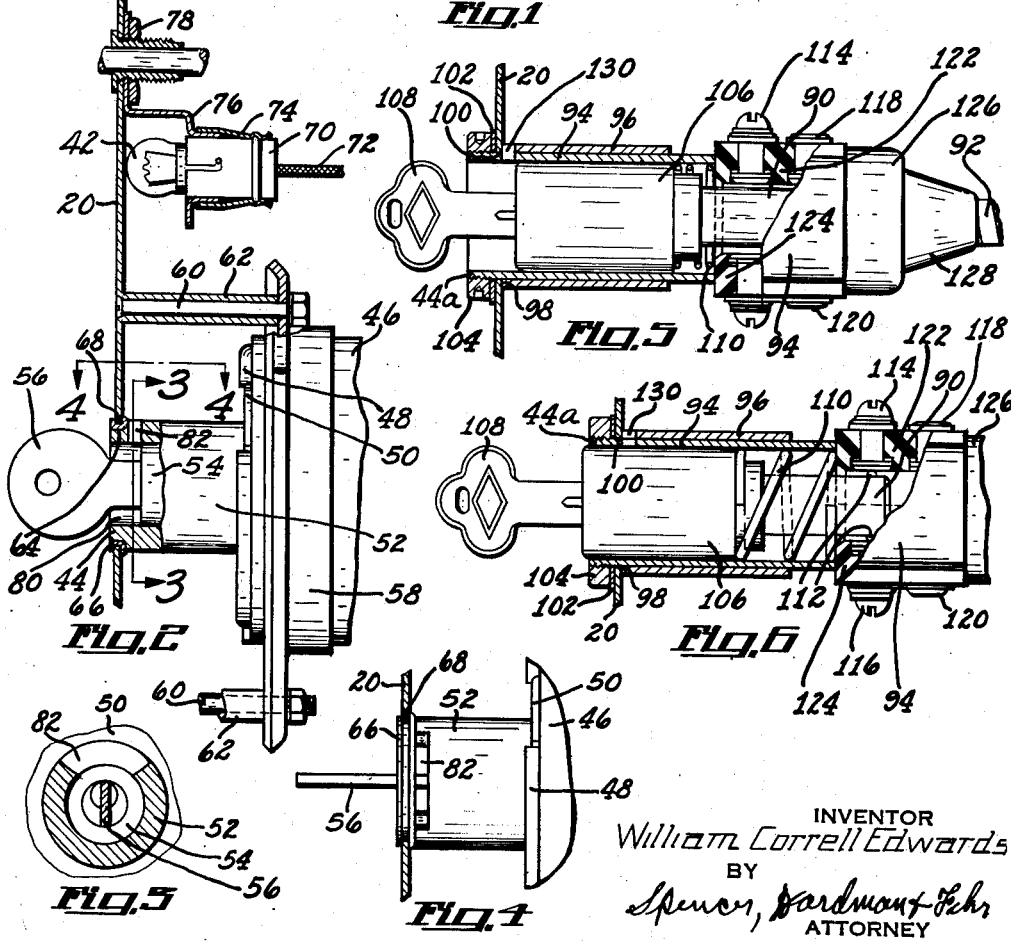
INVENTOR
William Correll Edwards
BY
Spencer, Hardman & Fehr
ATTORNEY Patented Apr. 9, 1935

1,997,457

UNITED STATES PATENT OFFICE 1,997,457

MEANS TO ILLUMINATE A CONTROLLER

William Correll Edwards, Anderson, Ind., assignor, by mesne assignments, to General Motors Corporation, Detroit, Mich., a corporation of Delaware Application February 13, 1933, Serial No. 656,508

8 Claims. (Cl. 240—8.16)

This invention relates to instrument panels for automotive vehicles, and particularly to means for illuminating controller devices mounted thereon.

One of the objects of the invention is to illuminate a key actuated controller for electrical or other devices that may be mounted behind an instrument panel of a vehicle. This object is accomplished in the disclosed embodiment by extending the enclosing casing beyond the locked position of the key actuated controller, and thence providing the casing with an aperture that will be disposed behind the instrument panel, yet in front of the key actuated device when in its locked position, and mounting the controller so that the case aperture will face a source of illumination whereby the light rays will pass through the aperture to illuminate the key slot of the lock.

Further objects and advantages of the present invention will be apparent from the following description, reference being had to the accompanying drawing wherein various alternative and optional forms of the present invention are clearly shown.

In the drawing:

Fig. 1 of the drawing is a fragmentary view of an instrument panel of an automotive vehicle illustrating one adaptation of the invention.

Fig. 2 is a sectional view substantially as indicated by the line and arrows 2—2 of Fig. 1.

Fig. 3 is a transverse sectional view of the controller casing substantially as indicated by the line and arrows 3—3 of Fig. 2.

Fig. 4 is a fragmentary view with certain parts in section illustrating in plan the controller casing substantially as viewed along the line and arrows 4—4 of Fig. 2.

Fig. 5 is a longitudinal sectional view of a modified form of controller with a key actuated device moved to the locked position.

Fig. 6 is a similar view of the same modification with the key actuated device moved to the unlocked position.

With particular reference to the drawings, 20 indicates the instrument panel of an automotive vehicle having an area 22 within which are grouped several control elements 24, 26, 28, 30 and 32, along with indicating instruments 34, 36, 38 and 40, which instruments are grouped about a source of illumination 42 whereby said instruments may be illuminated. Recently, it has been the practice to mount an additional controller element or unit 44 at some convenient point behind the instrument panel 20.

This controller element may be the combination lock switch and coil unit 46 as illustrated in Figs. 1 and 2, or it may be embodied in the lock switch extension type illustrated in Figs. 5 and 6, wherein the controller 44a is united with a switch structure 90, the electrical connections of which are housed by an armored means 92 leading to any essential element of the automotive electrical or other system.

With reference first to the disclosure made in Figs. 1 to 4 inclusive, the controller element comprises the usual lock switch coil indicated by 46 which has a mutilated flange, or perhaps a plurality of tongue-like members 48, bent against a plate 50 secured to a lock casing 52 housing a key actuated lock plug 54 to be manipulated by an appropriate key 56. Means are provided for securing or otherwise mounting the controller unit to an instrument panel which is herein embraced in a sleeve or collar 58 secured to the element 46. Tie bolts 60 passing through spacers 62 may be used for mounting the controller upon the instrument panel 20. In mounting the controller, the extended end of the case 52 is provided with a rabbeted edge or reduced portion 64 that telescopes with or seats within a grommet or bezel ring 66 secured in an aperture 68 of the instrument panel, thus making the controller accessible from the front of the instrument panel.

An instrument lamp or source of illumination 42 is installed on the instrument panel and includes a lamp socket 70 having a lead 72 communicating with a source of energy, which socket may be secured by a clip 74 supported from any convenient part of the instrument panel, as by the bracket 76 having a lug secured beneath the clamping nut 78, by which the control element 28 is also mounted.

The controller of the form illustrated in Figs. 1 and 2 embraces the key actuated device 54 of the rotary type, that is actuatable by a key 56 to an ON and OFF position, or what may be termed unlocked and locked positions respectively. In perfecting the instant invention, the case 52 has been extended somewhat beyond the end of the key actuated device 54 so that the key actuated device is relatively recessed or countersunk as indicated at 80 in Fig. 2. The case 52 is thence provided with an aperture 82 through a side wall of the same so as to lie between the forward face of the key actuated device 54 and the rabbeted edge 64 of the case. In mounting the controller unit upon the instrument panel the aperture 82 will be disposed behind the panel, and the controller is so oriented as to present the case aperture 82 in a facing relation with respect to the source of illumination 42. By so doing, the light rays from the source 42 will pass through the opening 82, and light up the recessed key actuated device 54.

The controller of the form illustrated in Figs. 5 and 6 is essentially the same in function and principle as that hereinbefore described, it comprising a casing 94 of tubular form encircled by a sleeve or shell 96 whose forward edge is inset somewhat from the terminating edge to provide a shoulder 98 by which the unit may be mounted upon the instrument panel 20 as illustrated in Figs. 5 and 6. In the disclosed embodiment this is accomplished by threading the end of the casing 94 and passing it through an aperture 100 of the panel where it is fitted with a shim 102 and a gland nut 104. In this form of the embodiment, a longitudinally movable lock plug or key actuated device 106 is controlled by a key 108, and operates to reciprocate an element of the lock structure 90 hereinbefore referred to, the switch structure being in OFF position or in locked position when associated as in Fig. 5, and capable of movement to the ON or unlocked position illustrated in Fig. 6 upon manipulation of the proper key 108. To facilitate this, a spring 110 is provided within the casing 94 that operates upon a part of the switch structure 90 or the key actuated device 106 or both to project the same to the unlocked position whenever the locking provisions are released. Cooperating with the movable part of the switch structure 90, there is included a movable contact 112 that is actuatable into position to bridge contact elements 114 and 116, or into a second position to bridge contact elements 118 and 120, which contact elements are supported by complementary blocks 122 and 124 secured within the end of the casing 94 by a ferrule or cup-like member 126, that operates to secure thereto the armored means 92 through the agency of a coupler device 128.

In this instance, both the casing 94 and its surrounding sleeve 96 are provided with an opening or openings 130 in a manner substantially as illustrated in Fig. 5. This opening 130 is so positioned that it will be wholly contained by the portion of the casing to the rear of the instrument panel 20, and so that at least a portion of the opening will be in advance of the end face of the lock plug 106 when it is moved to its locked or circuit open position as illustrated in Fig. 5. When this controller unit is mounted upon the instrument panel 20 so that its aperture 130 will face the source or one of the sources of instrument illumination, then the light rays from said source or sources may enter the aperture 130 to light up the key aperture of the plug 106.

By the instant invention it is made possible for the operator of the automobile to more readily determine the condition of his ignition circuit especially during the darkened hours. It is made easier for him to apply the proper key to the controller device, since he may turn on the instrument lamp and immediately the key-way of the key controlled device will be well illuminated, and thus disclose whether or not the controller is in the ON or OFF position. This is especialy true with respect to the form illustrated in Figs. 5 and 6 wherein the key controlled device 106 is moved to the inward position when in the OFF or locked condition, and is moved outwardly when in the unlocked condition. Thus, if the instrument light is turned on, the recessed portion of the casing 94 in front of the lock plug 106 will be illuminated indicating that the controller is in the locked position, and this same space will be darkened if the controller is in the unlocked position. In both types of controllers it is usual that the keys 56 or 108 may not be removed from their respective lock plugs or key actuated devices when the same are in the unlocked position, but may be removed therefrom only in the controller locked position. This being the case, the absence or presence of the key in the lock will indicate the locked or unlocked condition of the controller, and it is not necessary for the attendant of the automobile to insert his key to try the device to see whether it is locked, or to feel around in the dark to ascertain the condition of the controller device, but has only to snap on his instrument lamp to give him a direct indication by illuminated presence or absence of the key in the controller lock device. If, when the attendant turns on the instrument lamp he notes that the receptacle for the key is without the key, or if he notes that the receptacle is illuminated then he is assured that the controller device is locked.

While the embodiment of the present invention as herein disclosed, constitutes various alternative and optional forms, it is to be understood that other forms might be adopted, all coming within the scope of the claims which follow.

What is claimed is as follows:

1. In an automotive vehicle providing an instrument panel with a lamp, the combination comprising, a tubular casing mounted at one end behind the instrument panel and opening therethrough, a key actuated controller comprising a lock plug carried by the casing and reciprocable along the casing so as to be recessed with respect to the casing end when in the locked position, said casing being apertured through a side wall of the same, and means supporting the casing so that the casing aperture will be behind the instrument panel and facing the instrument lamp, said lock plug being illuminated by means of said casing aperture when the said lock plug is in its recessed position.

2. In an automotive vehicle providing an instrument panel with a lamp, the combination comprising, a tubular casing mounted behind the instrument panel and opening therethrough, a key actuated controller comprising a lock plug retained in the casing and having limited longitudinal movement along the same so as to be recessed with respect to the casing when in a locked position, a side wall of said casing being apertured substantially coexistent with the face of said plug when in its recessed position, means mounting the casing at one end so that the side wall aperture is disposed behind the instrument panel and so that the lock plug is accessible through the said panel, said casing being mounted so that the side wall aperture faces the instrument lamp whereby the lock plug may be illuminated when it is moved to its recessed position.

3. In an automotive vehicle, the combination comprising, an instrument panel, an instrument lamp mounted behind the panel, a controller mounted behind the panel and comprising a key actuated element movable into a locked and an unlocked position, a casing enclosing the element and guiding its movement in a lineal direction, said element being recessed relative to the end of said casing while in the locked position, means including an extension of the casing for mounting the controller from the instrument panel so as to be accessible therethrough, the extended portion of said casing being apertured so as to illuminate the key actuated element while in its recessed position and so as to be covered by the element when it is moved to the unlocked position.

4. In an automotive vehicle, the combination comprising, an instrument panel, an instrument lamp mounted behind the panel, a controller mounted behind the panel and comprising a tubular case, a key actuated element enclosed by and movable along the case to a locked and unlocked position, said case extending beyond the key actuated element while in its locked position, and means including said case extension for mounting the controller in an aperture in the instrument panel, said case extension being apertured at a point between the locked position of said element and the part attached to the panel, so as to be disposed behind the instrument panel whereby the key actuated element will be illuminated while in the locked position, but will cover the aperture while in the unlocked position.

5. In an automotive vehicle, the combination comprising, an instrument panel, an instrument lamp mounted behind the panel, a controller mounted behind the panel and comprising a tubular case, a key actuated element slidable along the case to a locked position and so that the front end of said element will be recessed with respect to the end of said case when in the locked position, and means including an aperture through said case in front of the element in the locked position for illuminating the key actuated element in one of its positions, the key actuated element shutting off the light when in the other position.

6. In an automotive vehicle, the combination comprising, an instrument panel, an instrument lamp mounted behind the panel, a controller mounted behind the panel and comprising a tubular case, a movable element within the case and actuatable linearly into a plurality of positions, said case projecting beyond the element and provided with means securing it to the panel, means admitting light from said lamp to illuminate the element in one of its positions, including an aperture through the projecting portion of the case, and means including the movable element for closing the aperture to light when the element is in another position.

7. In an automotive vehicle, a key actuated controller comprising in combination, a tubular case for mounting the controller, a key actuated element movable within the case to a plurality of positions, means including an extension of the case for mounting the controller, and means providing illumination to the key controlled element including an aperture through the extended portion of the case, said key actuated element covering the aperture when in the released position.

8. In an automotive vehicle, a controller therefor comprising in combination, a key actuated element slidable into a plurality of positions, a case surrounding said element and extending over the end thereof to provide a recess, means for mounting said controller including the extended portion of said case, and means for illuminating the front end of said key actuated element when in its innermost position including an aperture in the extended portion of said case, said key actuated element being movable to a projected position wherein the illumination aperture is closed.

WILLIAM CORRELL EDWARDS.